2,784,171

CADMIUM ALKYL VINYL PHOSPHONATE STABILIZED HALOGEN-CONTAINING RESIN COMPOSITIONS

David H. Chadwick, Webster Groves, Mo., assignor to Monsanto Chemical Company, St. Louis, Mo., a corporation of Delaware No Drawing. Application June 17, 1955, Serial No. 516,326

9 Claims. (Cl. 260—45.75)

This invention relates to the stabilization of halogen-containing resin compositions. More particularly this invention is concerned with providing the art with a light stabilized halogen-containing resin composition.

In accordance with this invention it has been found that halogen-containing resin compositions having improved light stability are obtained by incorporating in a halogen-containing resin a cadmium alkyl vinylphosphonate of the structure

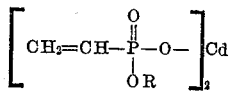

where R is an alkyl radical containing from 1 to 6 carbon atoms, e. g. methyl, ethyl, n-propyl, isopropyl, n-butyl, isobutyl, n-amyl, isoamyl, n-hexyl, isohexyl, and the like.

The cadmium alkyl vinylphosphonates of this invention are prepared by reacting cadmium chloride with a dialkyl vinylphosphonate at a temperature in the range of about 150° C. to about 225° C. These cadmium salts and the preparation thereof are described and claimed in my copending application Serial No. 515,235, filed June 13, 1955, of which application this application is a continuation-in-part.

The following example is illustrative of this invention but it is not to be considered as limitative thereof. Where parts are mentioned they are parts by weight.

| Compositions comprising— | A | B | C | D |
|---|---|---|---|---|
| Polyvinyl chloride | 100 | 100 | 100 | 100 |
| Di(2-ethylhexyl) phthalate | 50 | 50 | 50 | 50 |
| Commercial light stabilizer [1] | | 3 | 2 | |
| Epoxidized soybean oil | | | 3 | |
| Cadmium ethyl vinylphosphonate | | | | 3 |

[1] Commercial light stabilizer consisting of a mixture of cadmium laurate and barium laurate.

are prepared by mixing polyvinyl chloride with the respective ingredients in the amounts set forth above on differential speed rolls at a roll temperature of 160° C. to form a homogeneous composition which is removed from the roll in the form of crude sheets. From the crude sheets there are molded finished sheets which are about 0.040 inch in thickness employing a molding cycle of three minutes at 160° C.

The light stability values set forth below are obtained after fadeometer exposure for the stated number of hours.

| Hours/Composition (fadeometer exposure) | A | B | C | D |
|---|---|---|---|---|
| 50 | red | colorless | colorless | colorless. |
| 200 | | few red specks. | slight discoloration. | Do. |
| 500 | | red | red | Do. |
| 1,600 | | | | Do. |

Replacing cadmium ethyl vinylphosphonate in the above with an equal weight of cadmium isopropyl vinylphosphonate, cadmium n-butyl vinylphosphonate and cadmium isoamyl vinylphosphonate, respectively, substantially the same outstanding light stabilizing results are obtained.

Substantially the same light stabilizing results are obtained by replacing di(2-ethylhexyl) phthalate in composition D above with such plasticizers as butyl benzyl phthalate, butyl phthalyl butyl glycolate, tricresyl phosphate and 2-ethylhexyl diphenyl phosphate.

As shown above, it is found that surprisingly effective stabilizing results are obtained according to the invention with halogen-containing resins generally, numerous examples of which are well known to those skilled in the art. Thus, there may be employed resins made from such vinylidene compounds as vinyl chloride, vinylidene chloride, vinyl chloracetate, chloro styrenes, chloro butadienes, etc. Such vinylidene compounds may be polymerized singly or in a mixture with these or other halogen-containing vinylidene compounds or with vinylidene compounds free from halogen. Among the unsaturated materials free from halogen which may be copolymerized with halogen-containing vinylidene compounds are vinyl esters of carboxylic acids, for example, vinyl acetate, vinyl propionate, vinyl butyrate, vinyl benzoate; esters of unsaturated acids, for example, alkyl acrylates, such as methyl acrylate, ethyl acrylate, propyl acrylate, butyl acrylate, allyl acrylate and the corresponding esters of methacrylic acid; vinyl aromatic compounds, for example, styrene, para-ethyl styrene, divinyl benzene, vinyl naphthalene, α-methyl styrene; dienes, such as butadiene; unsaturated amides, such as acrylic acid amide, acrylic acid anilide; unsaturated nitriles, such as acrylic acid nitrile; esters of α,β-unsaturated carboxylic acids, for example, the methyl, ethyl, propyl, butyl, amyl, hexyl, heptyl, octyl, allyl, methallyl, and phenyl esters of maleic, crotonic, itaconic, fumaric acids and the like. The class of copolymers in which a predominant portion, i. e., more than 50% by weight, of the copolymer is made from a halogen-containing vinylidene compound such as vinyl chloride represents a preferred class of polymers to be treated according to the invention.

Among the preferred embodiments of the invention is the stabilization of polymers prepared by the copolymerization of vinyl halides, e. g. vinyl chloride with α,β-unsaturated polycarboxylic acids such as diethyl maleate or other esters of maleic, fumaric, aconitic, itaconic acids, etc. Among the preferred esters of such acids are alkyl esters in which the alkyl group contains not over eight carbon atoms.

The stabilizer of the invention is also effective when intimately mixed with halogen-containing resins in which part or all of the halogen is introduced into preformed resin, e. g. chlorinated polyvinyl acetate, chlorinted polystyrene, chlorinated polyvinyl chloride, chlorinated natural and synthetic rubbers, rubber hydrochloride, etc.

The light stabilizing agent of this invention is also effective in halogen-containing resins containing halogens other than chlorine, e. g. bromine, fluorine and iodine.

The halogen-containing resins may contain a varying proportion of halogen depending upon the nature of the resin and its contemplated use. However, as indicated above, vinyl chloride polymers in which the proportion of vinyl chloride units amounts to 50% or more of the total monomer used in making the polymeric product represents a preferred class of polymers to be stabilized according to the invention.

The amount of cadmium alkyl vinylphosphonate employed in light stabilizing the halogen-containing resin may be varied widely and still provide surprising improvement. Usually at least 0.5 part by weight is used for each 100 parts by weight of halogen-containing resin and generally from 2 to 10 parts by weight are preferred. The use of less than 0.5 part by weight is effective to a considerable degree and amounts larger than 10 parts may be used although further improvement in stability of the resulting compositions is not in direct proportion to the amount used.

The light stabilizer of this invention is of particular importance in stabilizing halogen-containing resins especially vinyl chloride polymers plasticized with phosphate esters such as the alkyl diaryl phosphates in which the alkyl group contains 6–14 carbon atoms and the aryl groups are phenyl or cresyl groups, i. e., ortho-, meta- or para-cresyl groups and mixtures thereof since compositions containing such plasticizers have proved to be especially difficult to stabilize. Examples of such esters include 2-ethylhexyl diphenyl phosphate, 2-ethylhexyl dicresyl phosphate, 2-ethylhexyl phenyl cresyl phosphate, hexyl diphenyl phosphate, hexyl phenyl cresyl phosphate, hexyl dicresyl phosphate, dodecyl diphenyl phosphate, dodecylphenyl cresyl phosphate, dodecyl dicresyl phosphate, etc. Mixtures of such esters may frequently be used advantageously. The amount of the phosphate ester which is used may be substantially varied depending upon the particular ester and upon the particular use which is contemplated for the plasticized composition. Usually, however, from 10 to 100 parts of the esters are used for every 100 parts of vinyl chloride-containing resin.

As indicated by the examples, plasticizers other than alkyl diaryl phosphate esters may be employed as well as mixtures of such phosphate esters and such conventional plasticizers as di-octyl phthalate, tricresyl phosphate, butyl phthalyl butyl glycolate, etc. In the case of certain halogen-containing resins no plasticizers are required.

In addition to the light stabilizer of this invention, other light stabilizers and also heat stabilizers may be included where desired examples of which are well known to those skilled in the art as well as other conventional additives such as other resins, lubricants, coloring materials, etc.

The foregoing description is given in illustration and not in limitation of the invention as set forth in the appended claims.

What is claimed is:

1. A composition resistant to the discoloring effects of light comprising a halogen-containing resin and a cadmium alkyl vinylphosphonate whose alkyl substituent contains from 1 to 6 carbon atoms.

2. A composition as defined in claim 1 wherein the halogen is chlorine.

3. A composition resistant to the discoloring effects of light comprising a plasticized chlorine-containing vinylidene resin and a cadmium alkyl vinylphosphonate whose alkyl substituent contains from 1 to 6 carbon atoms.

4. A composition as defined in claim 3 wherein the resin is polyvinyl chloride.

5. A composition as defined in claim 3 wherein the resin is a vinyl chloride-vinyl acetate co-polymer.

6. A composition as defined in claim 3 wherein the resin is a vinyl chloride-diethyl maleate copolymer.

7. A composition resistant to the discoloring effects of light comprising a chlorine-containing vinylidene resin, a phosphate ester plasticizer therefor, and a cadmium alkyl vinylphosphonate whose alkyl substituent contains from 1 to 6 carbon atoms.

8. A composition as defined in claim 7 wherein the phosphate ester plasticizer is an alkyl diaryl phosphate in which the alkyl group contains from 6 to 14 carbon atoms and wherein the aryl radical is selected from the group consisting of phenyl and cresyl.

9. A composition as defined in claim 8 wherein the cadimum alkyl vinylphosphonate is cadmium ethyl vinylphosphonate.

References Cited in the file of this patent

UNITED STATES PATENTS 2,488,662     Farrington et al. _____ Nov. 22, 1949